United States Patent
Zhou et al.

(10) Patent No.: US 10,354,024 B2
(45) Date of Patent: Jul. 16, 2019

(54) FAILSAFE TOPOLOGY OPTIMIZATION

(71) Applicant: Altair Engineering, Inc., Troy, MI (US)

(72) Inventors: Ming Zhou, Newport Coast, CA (US); Raphael Fleury, Costa Mesa, CA (US)

(73) Assignee: Altair Engineering, Inc., Troy, MI (US)

( * ) Notice: Subject to any disclaimer, the term of this patent is extended or adjusted under 35 U.S.C. 154(b) by 293 days.

(21) Appl. No.: 15/250,473

(22) Filed: Aug. 29, 2016

(65) Prior Publication Data

US 2017/0344667 A1    Nov. 30, 2017

Related U.S. Application Data

(60) Provisional application No. 62/340,643, filed on May 24, 2016.

(51) Int. Cl.
    *G06F 17/50*    (2006.01)
(52) U.S. Cl.
    CPC ...... *G06F 17/5004* (2013.01); *G06F 17/5086* (2013.01); *G06F 2217/08* (2013.01)
(58) Field of Classification Search
    None
    See application file for complete search history.

(56) References Cited

U.S. PATENT DOCUMENTS

| | | | |
|---|---|---|---|
| 5,884,232 | A | 3/1999 | Buder |
| 2010/0058257 | A1 | 3/2010 | Park |
| 2011/0224952 | A1* | 9/2011 | Marasco et al. |

OTHER PUBLICATIONS

Bendsøe et al., "Topology Optimization: Theory, Methods and Applications," Springer-Verlag, 2004, 7 pages.

Bendsøe, M.P., "Optimal shape design as a material distribution problem," Springer-Verlag, May 1989, Structural Optimization 1: 193-202.

Chen et al., "A new level-set based approach to shape and topology optimization under geometric uncertainty," Struct Multidisc Optim, May 2011, 44:1-18.

Chen et al., "Level set based robust shape and topology optimization under random field uncertainties," Struct Multidisc Optim, Jan. 2010, 41:507-524.

Deaton et al., "A survey of structural and multidisciplinary continuum topology optimization: post 2000," Struct Multidisc Optim, 2014, 49:1-38.

Guest, James K., "Imposing maximum length scale in topology optimization," Struct Multidisc Optim, 2009, 37:463-473.

(Continued)

*Primary Examiner* — Syed A Roni
(74) *Attorney, Agent, or Firm* — Fish & Richardson P.C.

(57) ABSTRACT

Failsafe robustness of critical load carrying structures is an important design philosophy for aerospace industry. The basic idea is that a structure should be designed to survive normal loading conditions when partial damage occurred. Such damage is quantified as complete failure of a structural member, or a partial damage of a larger structural part. This paper establishes for the first time the concept and formulation of failsafe requirement within the context of topology optimization. Efficient computational scheme and computer implementation are carried out. Several examples are shown to demonstrate the impact of failsafe requirement to design concept generated by topology optimization.

35 Claims, 13 Drawing Sheets

(56) References Cited

OTHER PUBLICATIONS

Jansen et al., "Topology optimization of fail-safe structures using a simplified local damage model," Struct Multidisc Optim, 2014, 49:657-666.
Kharmanda et al., "Reliability-based topology optimization," Struct Multidisc Optim, 2004, 26:295-307.
Krog et al., "Application of Topology, Sizing and Shape Optimization Methods to Optimal Design of Aircraft Components," Altair Engineering Ltd., 2002, 12 pages.
Lazarov et al., "Topology optimization considering material and geometric uncertainties using stochastic collocation methods," Struct Multidisc Optim, Mar. 2012, 46:597-612.
Le et al., "Stress based topology optimization for continua," Struct Multidisc Optim, 2010, 41:605-620.
Michell et al., "The Limits of Economy of Material in Frame-structures," Phil. Mag., Nov. 1904, 8(47):588-597.
Nguyen et al., "Single-loop system reliability-based topology optimization considering statistical dependence between limit-states," Struct Multidisc Optim, Jul. 2011, 44:593-611.
Niu, Michael C.Y., "Damage Tolerant Panels (Tension)," Airframe Stress Analysis and Sizing, Adastra Engineering LLC, 1997, 5 pages.
Niu, Michael C.Y., "Fatigue, Damage Tolerance and Fail-Safe Design," Airframe Structural Design, Adastra Engineering LLC, 1999, 4 pages.
Olhoff, N., "Multicriterion structural optimization via bound formulation and mathematical programming," Structural Optimization, 1989, 1:11-17.
Rozvany et al., "Analytical and numerical solutions for a reliability-based benchmark example," Struct Multi Optim, Mar. 2011, 43:745-753.
Rozvany, G.I.N., "A critical review of established methods of structural topology optimization," Struct Multi Optim, 2009, 37:217-237.
Rozvany, G.I.N., "Aims, scope, methods, history and unified terminology of computer-aided topology optimization in structural mechanics," Struct Multi Optim, 2001, 21:90-108.
Sigmund et al., "Topology optimization approaches," Struct Multi Optim, Aug. 2013, 48:1031-1055.
Silva et al., "Component and system reliability-based topology optimization using a single-loop method," Stuct Multi Optim, 2009, 41:87-106.
Zhou et al., "An integrated approach to topology sizing, and shape optimization," Struct Multi Optim, 2004, 26:308-317.
Zhou et al., "The COC algorithm, Part II: Topological, geometrical and generalized shape optimization," Elsevier Science Publishers B.V., Aug. 1991, 89:309-336.

* cited by examiner

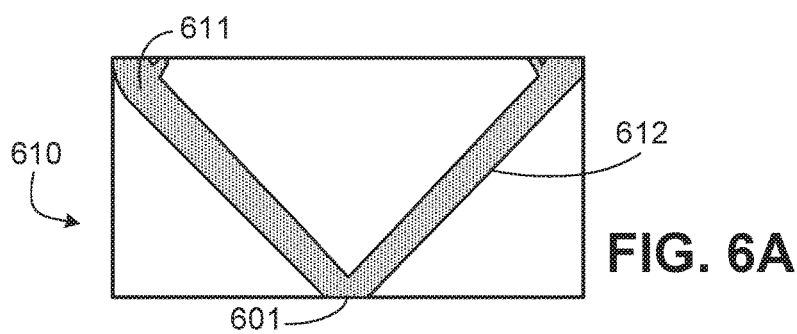
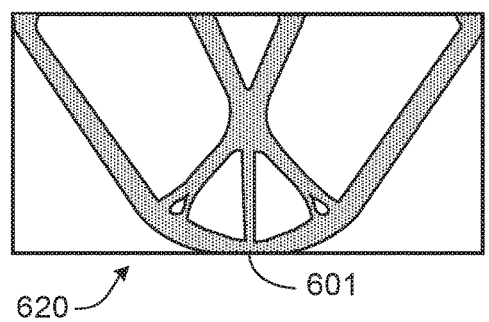 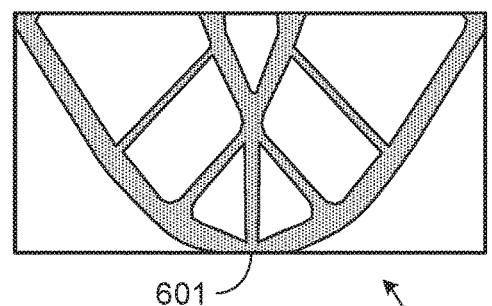
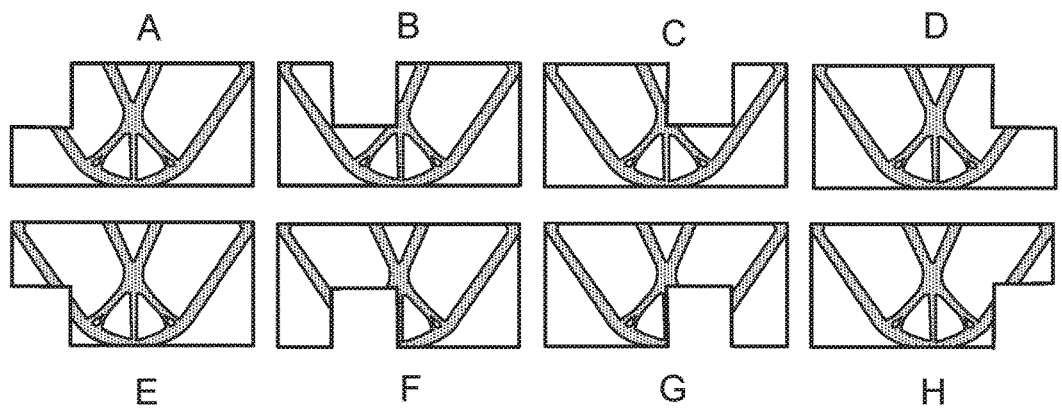

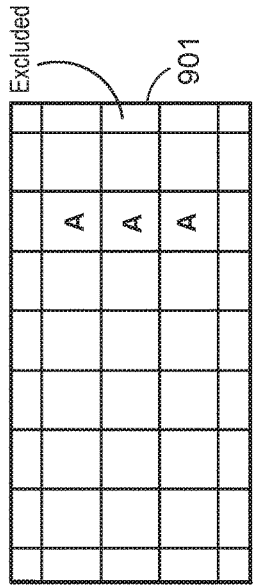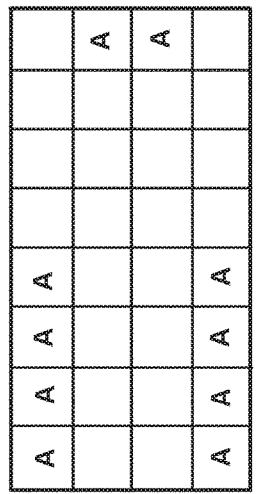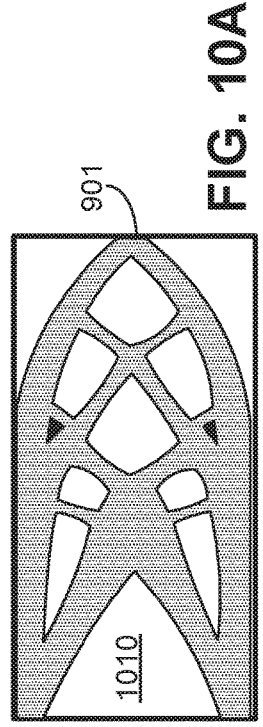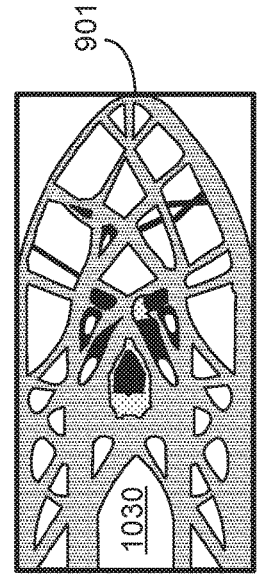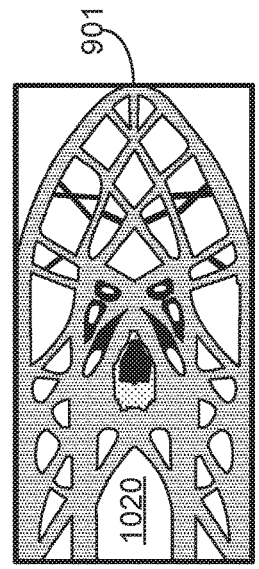
FIG. 9A
FIG. 9B
FIG. 10A
FIG. 10B
FIG. 10C

FAILSAFE TOPOLOGY OPTIMIZATION

CROSS-REFERENCE TO RELATED APPLICATIONS

This application claims benefit of Provisional Application No. 62/340,643 entitled "FAILSAFE TOPOLOGY OPTIMIZATION," filed on May 24, 2016, the entire contents of which are incorporated herein by reference.

FIELD OF THE INVENTION

The invention relates to failsafe topology optimization.

BACKGROUND

Topology optimization has long been an active research area within the field of engineering optimization. For example, topology optimization is described in *Topology Optimization—Theory, Methods and Applications*, by Bendsøe and Sigmund, Springer, Berlin (2004).

In general, this disclosure relates to design involving uncertainties, known generally as reliability based design optimization (RBDO). Since mid-2000 there has been increasing research on reliability based topology optimization (RBTO) considering uncertainties in loads, material, boundary geometry or fabrication. However, failsafe design has not been directly addressed in relation to topology optimization. Failsafe refers to structures that demonstrate sustained structural integrity under the condition that an arbitrary structural element fails. Designing structures to be failsafe is important in applications where structural failure is catastrophic, such as in aircraft and nuclear power plants, for example. Failsafe design philosophy is an important reason why flying is considered so safe today. Indeed, relatively few catastrophic aircraft accidents are due to structural failures Topology optimization has seen fast growing adoption throughout many major industries since the turn of the millennium. This includes successful aerospace applications during development of the new generation airliners such as A380, 350 and B787. However, the inability of taking failsafe requirement into consideration is a significant limitation. In fact, as optimization process pushes material utilization to maximum efficiency, design tends to be less redundant in general. For example, results of topology optimization are often benchmarked against Michell trusses which, while highly efficient, are statically determinate with zero structural redundancy.

SUMMARY

In the context of topology optimization, the first challenge for failsafe consideration lies in defining member failure test before structural members emerge from the optimization process. The second challenge lies in creating a computational scheme that is efficient enough to solve real world problems.

The present disclosure features a formulation for failsafe design in the context of topology optimization of a structural continuum. The problem of failsafe design is mathematically represented by a structure containing a given size damage (i.e., a volume of the structural continuum devoid of material) randomly located within the structural domain. An approximate treatment of the original problem is constructed with a predefined finite damage population. A simple formulae for maximum material survival rate under a given damage population size for cube damage is disclosed.

An efficient computational scheme for the failsafe design problem involving a large number of structural cases each with damage located at a different position is also disclosed. The number of structural cases, while large, is finite and the disclosure features defining finite damage populations which provide computational efficiency (e.g., relative to approaches using an infinite damage population) and a practical level of structural redundancy to ensure that a resulting topology is failsafe to a desired degree.

The scheme may be implemented using a Message Passing Interface (MPI) parallel implementation using commercially-available analysis software. As each of the structural cases are independent of each other, a MPI parallel implementation may be used for efficient solution.

An automatic procedure for placing damage cubes for a chosen domain and population level can also be implemented. The algorithm creates models representing each structural case and initiates a MPI solution process. High Performance Computing (HPC) resources are widely available today, making it possible to solve this problem with very efficient turnaround time.

From an engineering perspective, the needs for redundant load paths may be sufficiently represented by a base layer of damage population constructed as gapless fill of cubes or spheres throughout the structural domain. This is termed Level-1 damage population $P_1$. Additional damage populations may also be used for more thorough analysis. For example, Level-2 population $P_2$ may be constructed by doubling the damage placement density, increasing the damage population eight times in a 3D domain.

In some implementations, a partial set of damage populations can be constructed. For example, a partial set of Level-2 damage population $PB_2$ can be used that only doubles the Level-1 population.

Added damage layers can be chosen to occupy the best hideout locations of Level-1 damages, e.g., centered at the junctures of the base layer damages. Such partial population of a given level may provide superior results because it can yield just a slightly higher material survival rate with a quarter of the full level damage population. It is believed that for engineering practice, partial Level-2 damage population can provide reliable modeling of structural survival under damage.

Various aspects of the invention are summarized below.

In general, in a first aspect, the invention features a computer-implemented method for designing a failsafe structure, the method including: (i) defining a structural continuum in a computational environment, the structural continuum corresponding to a homogenous distribution of a solid material through a design volume; (ii) defining a damage volume in the structural continuum, the damage volume corresponding to a portion of the structural continuum devoid of the material at an arbitrary location within the design volume; and (iii) computationally optimizing a topology for a design of the failsafe structure subject to the damage volume and to one or more designated load cases. The optimized topology for the design corresponds an inhomogeneous distribution of the solid material through the design volume such that the design volume is composed of portions of the solid material and voids, the solid material portions defining the failsafe structure which will continue to support all the designated load cases when the material is removed from a damage volume at any location in the design volume. The computational optimization includes performing a computational structural analysis on the structural continuum with a finite damage population, the finite damage population corresponding to locating the damage volume at a first series of different locations in the structural continuum, the damage volumes located at adjacent locations in the first series of different locations being non-overlapping damage volumes.

Implementations of the method can include one or more of the following features and/or features of other aspects. For example, the computational structural analysis can include analyzing a plurality of analysis models, each analysis model comprising the structural continuum with a corresponding instance of damage from the finite damage population. Each analysis model can be analyzed in parallel on a computer cluster.

The finite damage population can span the structural continuum.

For the first series, damage volumes at adjacent locations can contact each other at at least one point in the structural continuum. For the first series, there can be no gap between damage volumes at the adjacent locations. For the first series, there can be no overlap between damage volumes at adjacent locations.

The finite damage population can exclude a damage volume from a location of a point load.

For each location in the first series, the damage volume can have the same shape (e.g., cube, rectangle, sphere) and dimensions.

The computational optimization can further include performing a computational structural analysis on the structural continuum for a second finite damage population, the second finite damage population corresponding to locating damage volumes at a second series of different locations, different from the first series, in the structural continuum. The second series can have twice as many locations in each dimension as the first series. Damage volumes of the second finite damage population can overlap with damage volumes of the first damage population.

The computational optimization can include comparing a structural parameter of the structural continuum with the damage volume under the one or more designated load cases. The structural parameter of the structural continuum with the damage volume under the one or more designated load cases can be compared to a structural parameter of an undamaged structural continuum under the one or more designated load cases. The structural parameter can be a stress. The stress can be below a threshold for the solid material for maintaining structural integrity of the structural continuum. In some embodiments, the structural parameter is a compliance. The computational optimization can include minimizing a largest compliance associated with each damage location of the finite damage population.

The computational structural analysis can be performed using a computational analysis method selected from the group consisting of finite element analysis (FEA), a boundary element method, and a meshless analysis method.

A dimension of the damage volume can be established based on design requirement for maximum damage size. The damage volume can have a shape selected from the group consisting of spherical, cubic, rectangular, prismatic, cylindrical, and conic.

The damage volume can be contained within the structural continuum or can extend through the structural continuum.

The structural members can be discrete structural members. A maximum member cross-sectional dimension can be constrained to no more than half of the maximum damage dimension. The structural members can be part of a monolithic component.

In general, in another aspect, the invention features a system, include: a data processing apparatus configured to receive information defining: (i) a structural continuum in a computational environment, the structural continuum corresponding to a homogenous distribution of a solid material through a design volume; and (ii) a damage volume in the structural continuum, the damage volume corresponding to a portion of the structural continuum devoid of the material at an arbitrary location within the design volume. The data processing apparatus is programmed to optimize a topology for a design of a failsafe structure subject to the damage volume and to one or more designated load cases. The optimized topology for the design corresponds to an inhomogeneous distribution of the solid material through the design volume such that the design volume is composed of portions of the solid material and voids, the solid material portions defining the failsafe structure which will continue to support all the designated load cases when the material is removed from a damage volume at any location in the design volume. The optimization includes performing a computational structural analysis on the structural continuum with a finite damage population, the finite damage population corresponding to locating the damage volume at a series of different locations in the structural continuum, the damage volumes located at adjacent locations in the first series of different locations being non-overlapping damage volumes.

Embodiments of the system can include one or more feature of other aspects.

In general, in a further aspect, the invention features a non-transitory computer readable medium storing a program causing a computer to execute a process for designing a failsafe structure, the process including: defining a structural continuum in a computational environment, the structural continuum corresponding to a homogenous distribution of a solid material through a design volume; defining a damage volume in the structural continuum, the damage volume corresponding to a portion of the structural continuum devoid of the material at an arbitrary location within the design volume; and computationally optimizing a topology for a design of the failsafe structure subject to the damage volume and to one or more designated load cases. The optimized topology for the design corresponds an inhomogeneous distribution of the solid material through the design volume such that the design volume is composed of portions of the solid material and voids, the solid material portions defining the failsafe structure which will continue to support all the designated load cases when the material is removed from a damage volume at any location in the design volume. The computational optimization includes performing a computational structural analysis on the structural continuum with a finite damage population, the finite damage population corresponding to locating the damage volume at a series of different locations in the structural continuum, the damage volumes located at adjacent locations in the first series of different locations being non-overlapping damage volumes.

BRIEF DESCRIPTION OF THE DRAWINGS

Exemplary embodiments will be described in detail based on the following figures, wherein:

FIGS. 6A-6C show solutions for a two bar truss in the structural continuum of FIG. 5A under shear force. FIG. 6A is the standard solution, while FIGS. 6A and 6B show failsafe solutions for the damage populations shown in FIG. 5C and the combined damage populations shown in FIGS. 5C and 5D, respectively.

FIGS. 7A-7H show the failsafe solution shown in FIG. 6B, with damage population shown in FIG. 5B.

FIGS. 8A and 8C show the solution for the damage population shown in FIG. 5C. FIGS. 8B and 8D show the solutions for the combined damage population shown in FIGS. 3C and 5D. In FIGS. 8C and 8D, symmetry is enforced, while in FIGS. 8A and 8B it is not.

FIGS. 9A and 9B show damage populations for the same structural domain as shown in FIG. 5A, but fixed at the left edge and under a vertical force at the center of the right edge. The load case can be characterized as a cantilever plate.

FIGS. 10A-10C show solutions for the topology optimization for the structural domain shown in FIG. 5A as a cantilever plate. The Standard solution is shown in FIG. 10A. Failsafe solutions are shown in FIGS. 10B and 10C, for damage populations shown in FIG. 9A and the combined damage populations shown in FIGS. 9A and 9B, respectively.

DETAILED DESCRIPTION

While the concept and practice of failsafe is easy to follow when the layout of load carrying structural members is already established, the definition of failure for design concept generation process, i.e., topology optimization, has yet to be established. The presumption of failsafe requires that failure test of a single member needs to progress through all structural members without exception. However, a dilemma lies in defining failure test before discrete members emerge during the iterative process of topology optimization. The failure test of 'a member' needs to be valid for any member shaped at any arbitrary location.

Figure 1A:
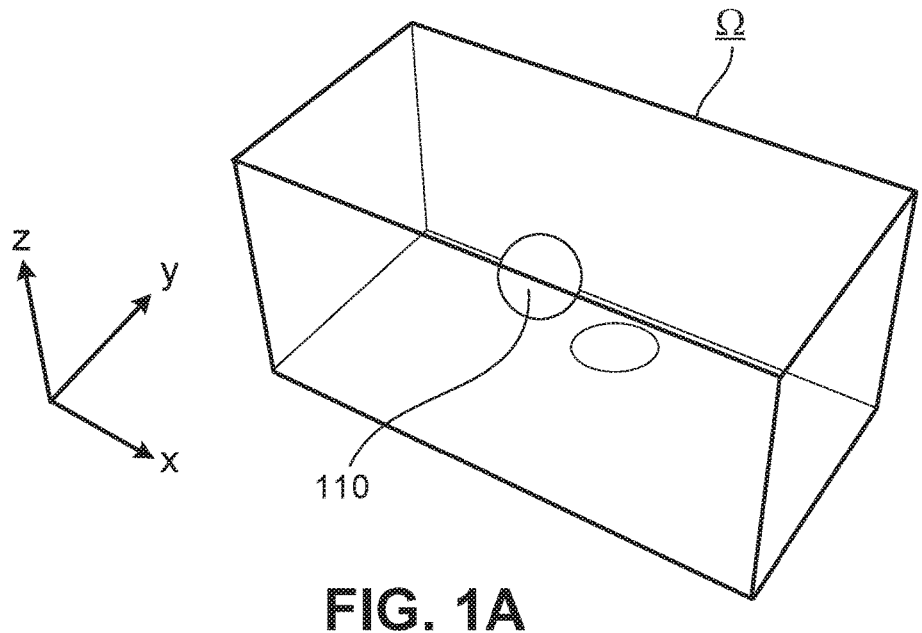
FIGS. 1A and 1B show a box-shaped structural domain containing a random sphere of damage (FIG. 1A) and a random cube of damage (FIG. 1B).

Referring to FIG. 1A, to meet this requirement the failure test of all structural members within a 3D box-shaped structural domain Ω can be established as a spherical damage 110 of diameter d randomly located in the given domain. Here, damage of a given shape and volume throughout the paper is defined as a location being entirely devoid of material. Random location means that the spherical damage be tested at any possible location in structural domain Ω, one instance at a time. No discrete structural member would survive a failure test as long as its cross-section doesn't exceed length scale d. If the cross-section of a structural part shaped by topology optimization is bigger than length scale d, the damage due to the presence of the given spherical damage results in partial failure in monolithic structure.

To help visualize the effect of the damage volume, one can picture the sphere as a magic eraser that only erases material where it currently occupies but doesn't leave trace behind. In other words, the material would recover from void to solid when the eraser is moved away.

The topology optimization problem for failsafe design can be defined as follows:

$$\text{Minimize } f(x)$$

$$\text{Subject to } (g_j(x) - g_j^U \le 0, j=1, \ldots, M) \text{ for } (S \subset \Omega / S \not\subset D_{random})$$

$$0.0 \le x_i \le 1.0, i=1, \ldots, N \qquad (1)$$

where $f(x)$ represents the objective function, $g_j(x)$ and $g_j^U$ the j-th constraint response and its upper bound, respectively. For failsafe design stress constraints should be primary focus, while displacement and other constraints could also be included if crucial for the survivability of the structure.

There are generally multiple load cases involved. For simplicity of notation, one may consider that the total number of constraints M included constraints from all load cases considered. All M constraints should hold for the residual structure S excluding a randomly located damage $D_{random}$. In essence, this represents an infinite number of structural cases. $x_i$ is the normalized material density of the i-th element. Using the SIMP topology optimization approach (see, e.g., *Optimum shape design as a material distribution problem*, by M. Bendsøe Strut. Optim. 1:193-202 (1989), and *The COC algorithm, Part II: topological, geometry and generalized shape optimization*, by M. Zhou and GIN Rozvany, Comp. Meth. Appl. Mech. Eng. 89:197-224 (1991)) where a power law penalty is applied to the stiffness density relationship:

$$\underline{K}_i(x_i) = x_i^p K_i \qquad (2)$$

where $\underline{K}_i$ and $K_i$ represent the penalized and the real stiffness matrix at full density of the i-th element, respectively, and p is the penalization power that is larger than 1.0. Typically p takes value between 2 and 4. A small lower bound, e.g., 0.01, is typically applied on the density variables to prevent singularity in the stiffness matrix. Note that the effect of elements at density lower bound is further significantly weakened by the power law.

For a structure with discrete members (e.g., a truss or frame-like structure), if damage D is larger than or equal to the largest structural member size in the design, it can completely destroy an arbitrary member as it moves through the structure to 'erase' a target. For a spread-out structural component, e.g., a plate with area larger than D, the damage produces a hole in the structure of the given size at the given location.

Figure 1B:
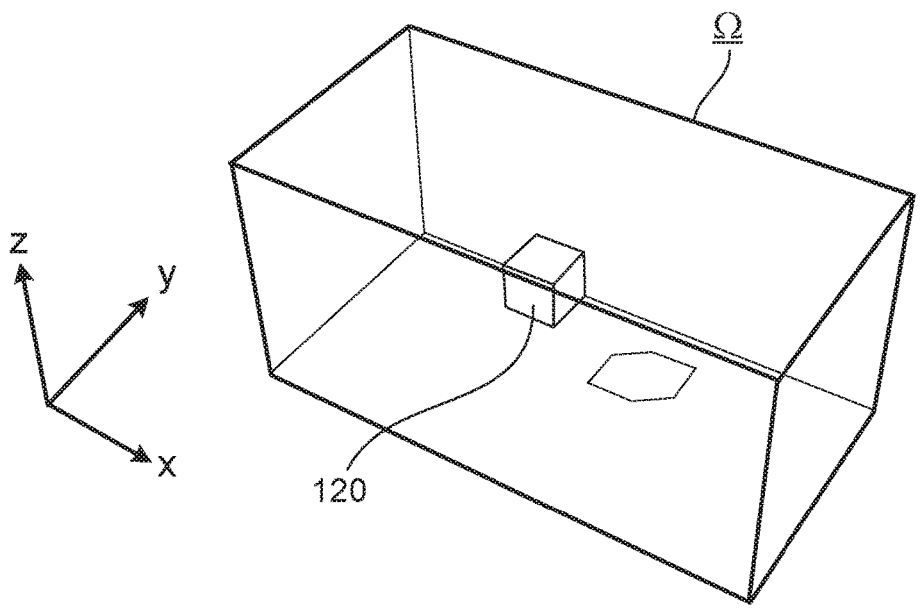

Before turning to solution strategy for failsafe topology optimization, it should be noted that alternative damage shapes can be used. For example, referring to FIG. 1B, a cube shaped damage 120 of edge length d is used. Though spherical damage is directionless and more generic, damage of a cube can also represent a practical use case without losing generality. As interactions of cubes are more easily illustrated and analyzed, cube form damage is primarily used for establishing a mathematical and engineering foundation. However, in general, any damage shape may be used.

From an engineering perspective, cube form damage with edge length equal to the diameter d of the spherical damage can be used as a more conservative representation as the devoid material volume contains the subset of the sphere at the same location. Therefore, one can assume that general qualitative observations drawn based on cube damage are valid for sphere damage as well.

The orientation of damage cubes may have quantitative implications. For example, the diagonal section of a cube can cause a larger sectional cut of a structural member in its most vulnerable cross-section. The orientation factor may be regarded as varying degrees of reserves relative to sphere damage. From application perspective, one should place cube orientation according to insights into the structure's directional vulnerability. When directional neutrality of damage is important, one may resort to sphere damage in actual modeling.

Turning to the solution strategy for failsafe topology optimization, it is noted that random placement of damage of a given size within a structural domain is challenging even for analysis because of the number of possible placement alternatives for the damage. One approach is to generate a structural model with damage placed at every element of the structural continuum. However, such an approach may become computationally unwieldy when the continuum is divided into a very large number of elements (e.g., $10^5$ or more elements). It is believed that strategic selection of damage locations can provide robust results with discrete, computationally manageable damage populations.

Figure 2A:
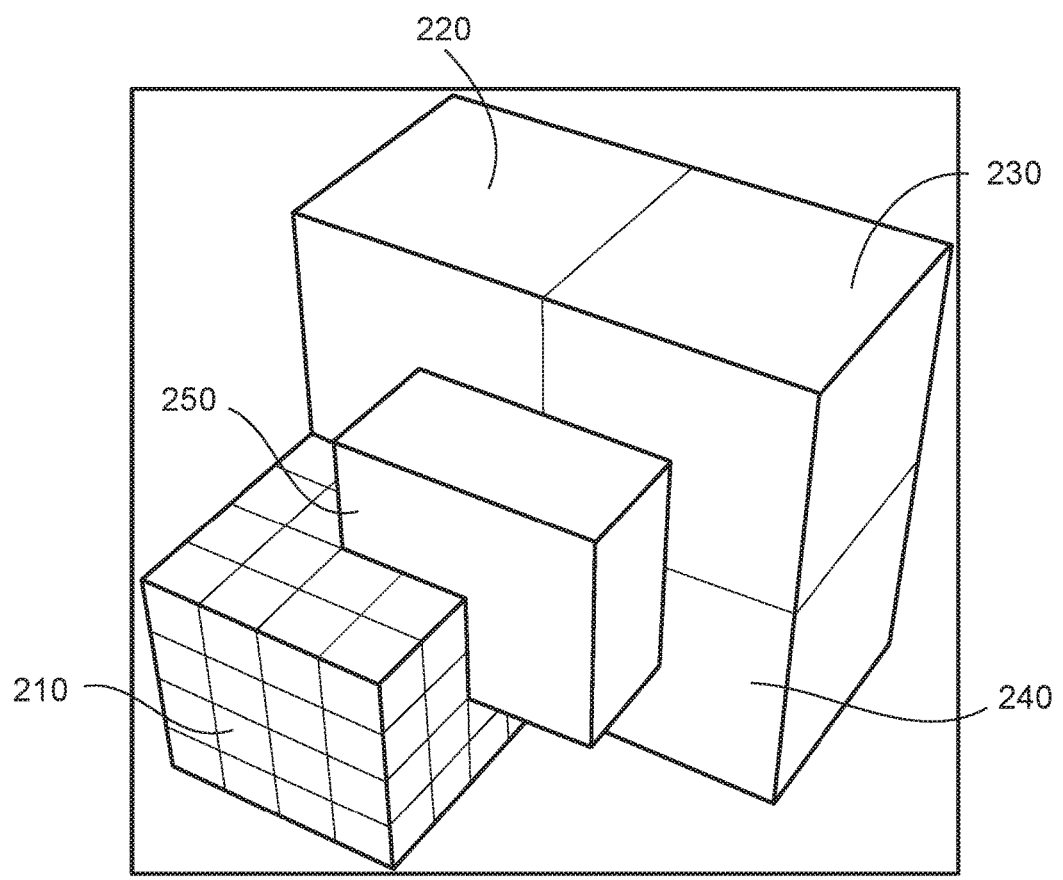
FIGS. 2A-2E schematically illustrate best hideout volumes among Level 1 and Level 2 damage cubes in a section of a structural continuum.

For convenience, cube-shaped damage is used in this section. In the following a serial process of damage population increase is introduced to explore the relationship between the damage population size and the maximum material survival rate within a random cube of the same size as the damage. From an engineering perspective it makes sense to start with a base damage population with damage cubes occupying the structural domain $\Omega$ evenly without gap and overlap. Referring to FIG. 2A, cubes 210, 220, 230, and 240 represent a base population $N_D$. First, a series of damage population size levels is established, termed Damage Series A (DS-A), with each level increase doubling the density of damages in each dimension.

Damage Series A can be divided into L different levels as follows:

(a) Level 1: A total number of $N_D$ damage cubes of size d are distributed evenly to cover the entire structural domain $\Omega$. Cubes 210, 220, 230 and 240 in FIG. 2A are representatives of the base Level 1 damage population. The centers of damages are evenly spread in $\Omega$, with diagonal distanced $\sqrt{3}d$ between neighboring cubes. The population size of Level 1 is $PA_1=N_D$. Each adjacent cube is in contact, leaving no gaps between the cubes.

(b) Level 2: The aim with Level 2 is to double the density of damage zones in each dimension to create evenly spread damage zones with distance between neighbors reduced to $\sqrt{3}d/2$. To achieve that, it is only needed to double the grid points of square centers along X, Y and Z, resulting in a damage population $PA_2=2^3 \times N_D = 8 \times N_D$. The eight-fold increase in population size is due to the doubled density in each of three dimensions.

(c) Level L: The aim with Level L is to double in each dimension the evenly spread damage population size from Level (L−1), producing a damage population $PA_L=2^{3(L-1)} \times N_D$. It can be readily established that for a 3D domain the total population of level L is always eight times the population of the previous level, i.e., $PA_L=8 \times PA_{(L-1)}$. Thus the increase of population to the next levels is always $\Delta PA_L=7 \times PA_{(L-1)}$.

A second damage series, termed DS-B, is constructed as a partial set of DS-A at all levels except Level 1. For DS-B:

(a) Level 1: The damage population starts exactly the same as DS-A, i.e., $PB_1=PA_1$.

(b) Level 2: Only a subset of Level 2 population in DS-A is retained. $PA_2$ in DS-A can be constructed by moving seven copies of $PA_1$ into bisection combinations along XYZ. The maximum distance $\sqrt{3}d/2$ between neighboring cubes does not change when only the copy moving diagonally in space is kept, shown as cube 250 in FIG. 2A. The resulting damage population is $PB_2=2 \times PA_1 = PA_2/4$.

(c) Level L: Following the logic in (b) $PB_L$ is constructed as $PA_{(L-1)}$ enriched with its copy shifted diagonally into bisection location in space, i.e., in all three dimensions XYZ. The total damage population is $PB_L=2 \times PA_{(L-1)}=PA_L/4$. Therefore, the population size of the partial set for DS-B is only a quarter of the complete set of DS-A at any level in the series.

The population size is summarized in Table 1 for varying damage levels.

For a given finite damage population size $P_L$ (i.e., $PA_L$ or $PB_L$) established at Level L, the design problem given in Eq. 3 can be formulated as follows:

Minimize $f(x)$

Subject to $(g_j(x)-g_j^U \leq 0, j=1, \ldots, M)$ for $(S \in \Omega \wedge S \not\subset D_l), l=1, \ldots, P_L$ $$0.0 \leq x_i \leq 1.0, i=1, \ldots, N \quad (3)$$

As discussed above, a simplified problem formulation for numerical examples is used in order to focus on the key phenomenon about failsafe. The Min(Max) compliance formulation for the failsafe problem becomes the following:

Minimize Max($C_l(x)$), for $(S \in \Omega \wedge S \not\subset D_l), l=1, \ldots, P_L$ Subject to $V-V^U \leq 0$ $$0.0 \leq x_i \leq 1.0, i=1, \ldots, N \quad (4)$$

where $C_l$ represents the sum of compliances, termed total compliance herein, of all static load cases for the structure $S \not\subset D_l$. The analysis and sensitivity calculation of a structural case involving a damage zone is a standard process except that the model (e.g., FEA model) has elements contained in the damage zone removed. In other words, load carrying capacity and sensitivity contribution from elements within Di are zero for the structural case $S \not\subset D_l$. Therefore, the optimization problem shown in Eq. (4) essentially aims to minimize the adverse impact of damages to the structural problem.

Compared to Eq. 1 the problem in Eq. 3 or Eq. 4 becomes numerically feasible, though computationally expensive.

The relationship between the damage population size and the maximum material survival rate is important for measuring the confidence level in the model because random failure corresponds to zero material survival of a random cube in the entire structural domain. Therefore the lower the maximum material survival rate of a random cube is, the closer the problem defined by a constructed finite damage population reflects the original problem.

It is believed that the problem defined by Damage Series A or B shown in Eq. 3 is equivalent to the original problem in Eq. 1 as the damage population $P_L$ approaches infinity. Because damages defined by DS-A and DS-B are evenly spread in the entire structural domain $\Omega$ with distance from one damage zone to another not exceeding $\sqrt{3}d/2^{(L-1)}$, the distance between damage zones approaches zero when L approaches infinity. In a visual display, when L approaches infinity every possible point in the space $\Omega$ would have defect that removes material of a cube of the given size d.

For a given damage population, it is important to understand the reliability of the model for capturing a random failure. From an engineering perspective, an unsafe scenario corresponds to a surviving cube with maximum residual material. In other words, one should find the best hideout location for a given damage population and calculate the material volume surviving damages intersecting with the cube. For $PA_1=PB_1$, it can be observed that the cube 250 shown in FIG. 2A represents the best hideout, with a volumetric survival rate of 87.5%. From the perspective of structural mechanics, the sectional residual is arguably a more important measure as forces are transferred directionally. It is easy to calculate that the sectional survival rate for cuts orthogonal to the coordinate system is 75% for the base damage population $PA_1=PB_1$.

Figure 2B:
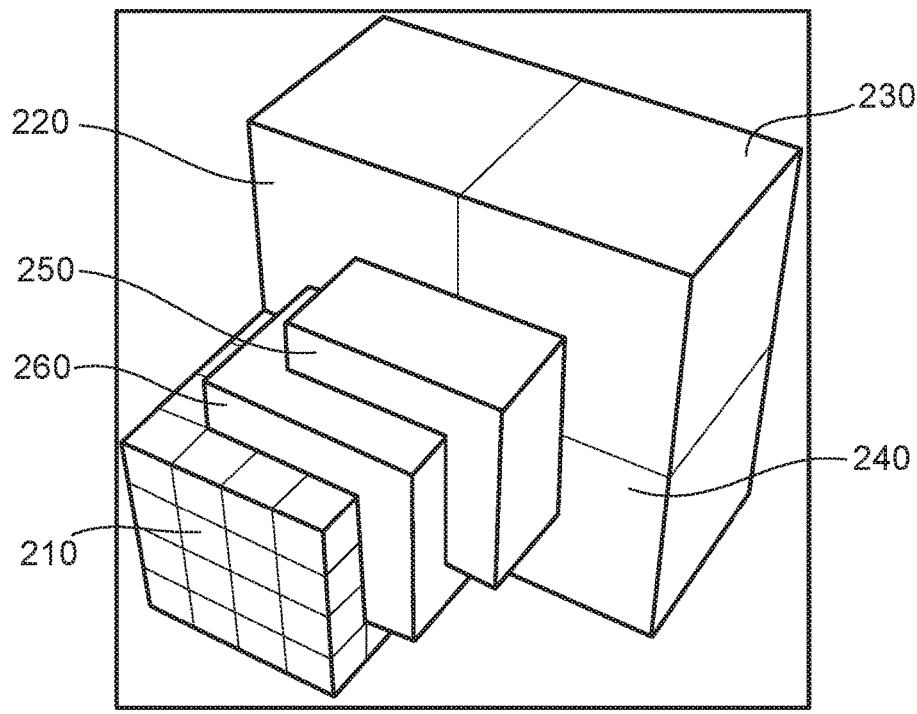
Figure 2C:
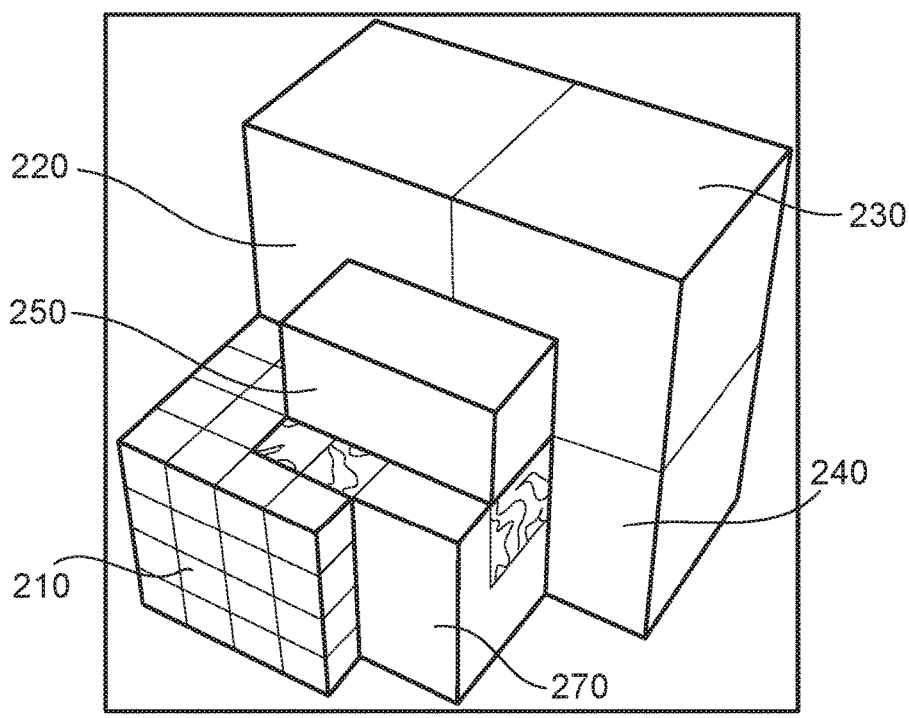

Referring to FIGS. 2B and 2C, visualization becomes much more crowded when damage population increases eight times from $PA_1$ to $PA_2$. For visual clarity, only the most damaging cubes in these images are shown. From analyzing geometric interactions it can be determined that cube 260 in FIG. 2B represents the best hideout for $PA_2$, with a sofa-corner shaped surviving volume at $(37/64)=57.81\%$ and sectional survival rate at 43.75%. For $PB_2$, a slightly better hideout can be found shown as cube 270 in FIG. 2C. The survival volume of cube 270 has a L-shape, or sofa-section shape, with a surviving volume and cross-section of 62.50% and 50%, respectively. This shows that DS-B is superior to DS-A in terms of computational efficiency since at any level about Level 2 one achieves just a slightly worse material survival rate with a quarter of the damage population.

For the damage population of the L-th level, it is believed that the above observation regarding the best hideout positions and surviving volume shapes holds true, albeit with thicknesses of the surviving sofa-corner (FIG. 2B) and sofa-section (FIG. 2C) halving to the next damage population level. The maximum sectional and volumetric survival rates for Level 1 to Level 5 are shown in Table 1, including exact formulae for Level L. These results were obtained by analyzing geometric interaction of intersecting cubes. The results were confirmed through numerical simulation with a billion random cube locations.

TABLE 1

Maximum material survival rate of a random cube for given damage populations

| Damage Level | Damage Population × $N_D$ DS-A | Damage Population × $N_D$ DS-B | Maximum Survival Rate of a Random Cube DS-A Sectional | Maximum Survival Rate of a Random Cube DS-B Sectional | Maximum Survival Rate of a Random Cube DS-A Volumetric | Maximum Survival Rate of a Random Cube DS-B Volumetric |
|---|---|---|---|---|---|---|
| 1 | 1 | 1 | 75.0% | 75.0% | 87.5% | 87.5% |
| 2 | 8 | 2 | 43.8% | 50.0% | 57.8% | 62.5% |
| 3 | 64 | 16 | 23.4% | 25.0% | 33.0% | 34.4% |
| 4 | 512 | 128 | 12.1% | 12.5% | 17.6% | 18.0% |
| 5 | 4096 | 1024 | 6.2% | 6.3% | 9.1% | 9.2% |
| ... | ... | ... | ... | ... | ... | ... |
| L | $P_L = 2^{3(L-1)}$ | $2 \times P_{(L-1)}$ | $\dfrac{2 \times 2^n - 1}{2^{2n}}$ | $2/2^n$ | $\dfrac{3 \times (2^{2n} - 2^n) + 1}{2^{3n}}$ | $\dfrac{3 \times 2^n - 2}{2^{2n}}$ |
| L → ∞ | ∞ | ∞ | $2/2^n$ | $2/2^n$ | $3/2^n$ | $3/2^n$ |

Accordingly, it may be concluded that for the case with infinite damage population: (1) failure test holds for any discrete member with maximum cross-sectional dimension smaller than damage size d; (2) for members with larger dimensions the presence of a size d damage establishes partial failure in monolithic structure. This conclusion may guide practical application of the failsafe analysis, specifically, the design engineer should define damage size d according to the target size for structural members classified as individual members. Obviously, as a practical matter, the fail-safe design problem should be solved under finite damage population, with as low a population size as possible. As damage population size increases exponentially with respect to population level, Level 2 may be considered a practical limit for many applications.

Figure 2D:
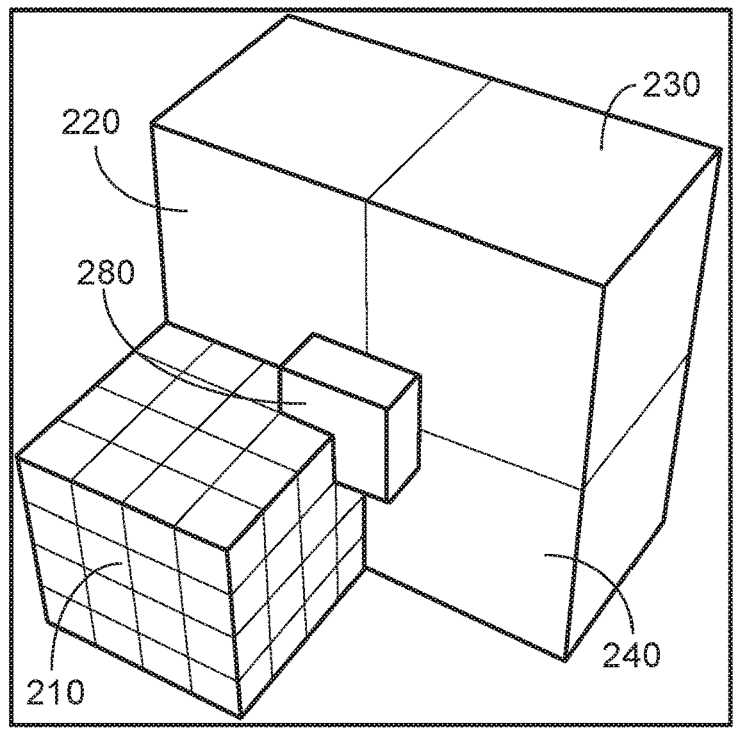
Figure 2E:
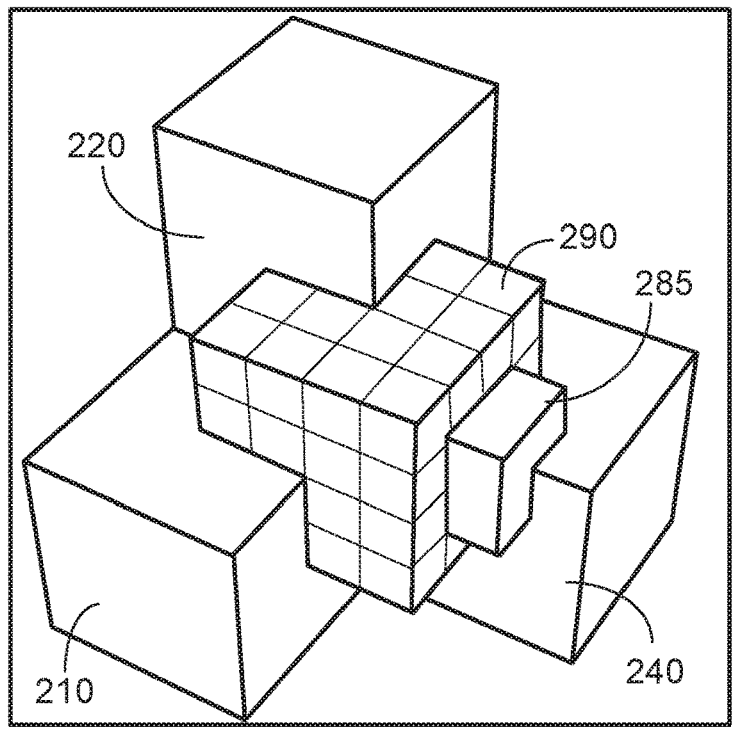

As noted above, Table 1 shows that the maximum sectional survival rate of a member with cross-sectional size d is 43.8% for full Level 2 damage population PA2, and slightly higher at 50% for partial Level 2 damage population PB2. Now, consider a reduction of the maximum cross-sectional length scale to d/2. Referring to FIG. 2D, the material survival rate for a representative cube 280 of size d/2 does not change for PA1. FIG. 2E shows the best hideout location for the half edge length cube 285 under PB2 (cube 290) that carries a volumetric and sectional survival rate of 50%. The sectional survival rates are directional, with 50% along two axes and 0% along the third axis. At full Level 2 damage population PA2 no survivable hideout place for the small size cube is evident. That suggests that the damage population series converge at Level 2 when maximum cross-sectional length scale is half of the damage cube size. This may present practical benefits as, at only eight times base damage population size, failure test of discrete members is strictly satisfied if damage size d is defined as twice the maximum length scale for topology optimization.

In the context of finite element analysis, the optimization problem in Eq. 1 involves $P_L$ structural cases with distinct Finite Element Analysis (FEA) models. The solution is computationally expensive. However, since each FEA model is completely independent from another, the analysis and sensitivity analysis can be solved entirely in parallel. Therefore, given a large enough computer cluster (e.g., an HPC cluster) with $P_L$ computing nodes the failsafe optimization problem can be solved at the same turnaround time as the base design problem without failure modes. The failsafe topology design framework may be implemented using commercial FEA software products, such as OptiStruct from Altair (Troy, Mich.), based on the multiple model optimization (MMO) framework. The MMO capability is a general feature aimed at optimizing structures of varying configurations, yet sharing some common design components. An example of MMO scenario is a car chassis platform on which three variations—sedan, van and SUV—are built. The MMO optimization problem involves three FEA models with a set of independent variables for each model, but also sharing common design variables on the chassis. In OptiStruct, MMO is implemented as a Message Passing Interface (MPI) parallel algorithm, with the master process orchestrating the optimization solution by assembling the analysis and sensitivity results from all models involved.

Figure 3:
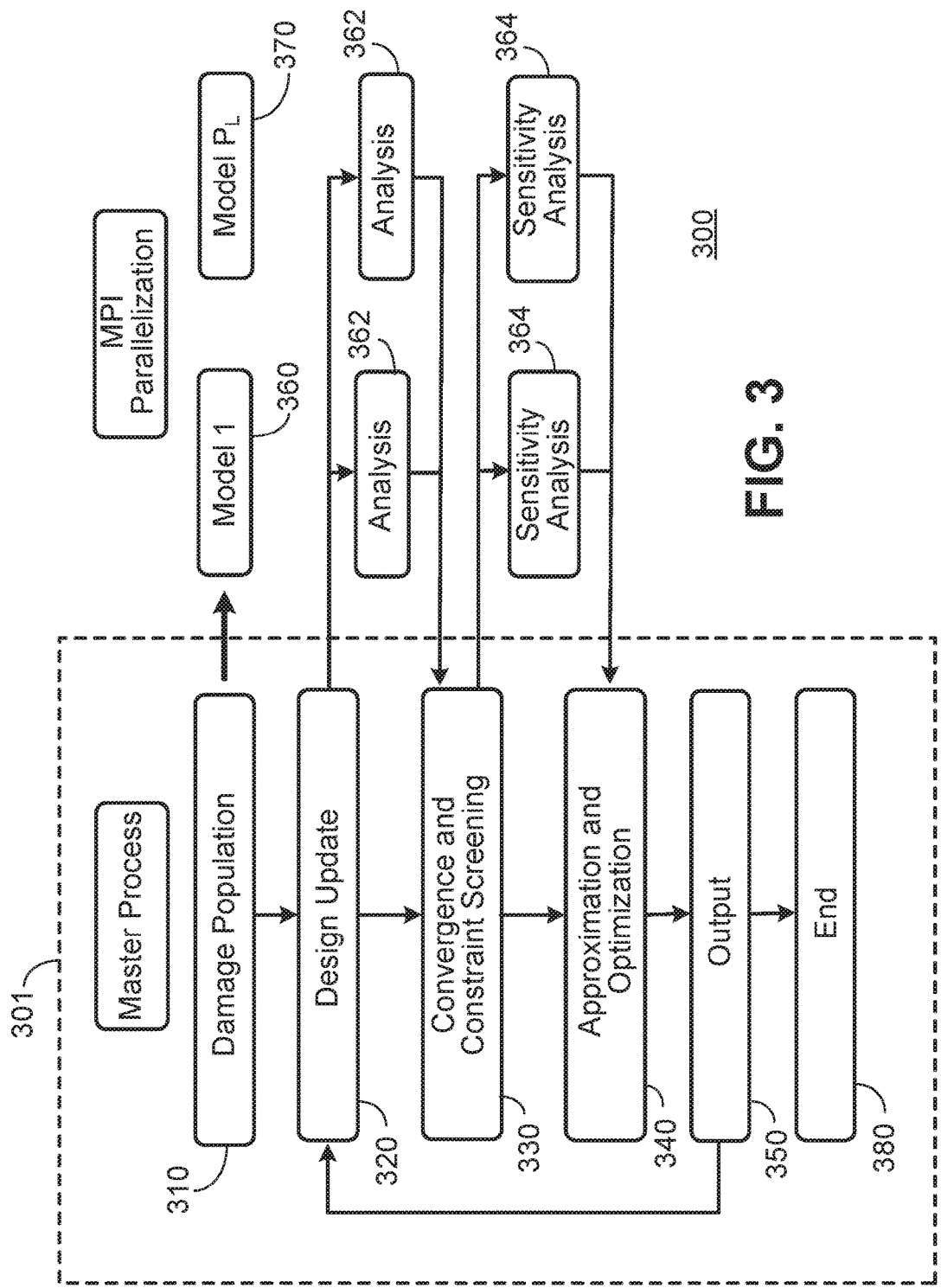
FIG. 3 is a flowchart showing an exemplary process for performing failsafe optimization in a parallel computing process.

Referring to FIG. 3, an iterative scheme of failsafe algorithm 300 is shown. Algorithm 300 is implemented as a MPI application with ($P_L$+1) processes, including a master process 301, which runs each model in parallel. Other parallel processing protocols may also be used.

In an initial step, damage population 310 of master process 301, with user input the algorithm establishes the size and shape of the continuous structural domain, $\Omega$. The continuous structural domain corresponds to a homogeneous distribution of solid material through the domain volume, defined via user-established boundaries. The algorithm also establishes the distribution of nodes within the domain and one or more damage population for the failsafe calculation. Each damage population is defined by a damage size, shape, and orientation, and series of damage locations, as discussed previously. The user also defines the material (or materials) forming the domain, boundary conditions for the structural domain and one or more load cases (e.g., composed of internal and/or external loads).

The computer system running master process 301 distributes each of the models to a different computing node for analysis 362. Initially, each model (1 ... $P_L$), including 360 and 370, is composed of the structural domain with damage at a corresponding location in the domain. Analysis of the undamaged model is also performed for performance reference. Analysis 362 involves solving the minimization problem of Eq. 1, above, where $f(x)$ is an objective function, such as stress or compliance.

Results of the analysis for each model is returned to the master process 301, which applies convergence and constraint screening 330 the analyses. This step involves identifying which models are critical, e.g., as having the highest compliance or stress and/or as exceeding a threshold compliance or stress. Stress, for example, should be maintained below the threshold for maintaining the structural integrity of the solid material of the structural continuum.

Based on the results of screening 330, a sensitivity analysis 364 is conducted on each model at the corresponding computing node. Sensitivity analysis involves analyzing how much the structure responds to small changes.

Next, master process 301 conducts and approximation and optimization process 340.

Master process 301 evaluates the results of approximation and optimization process 340 at 350 to assess whether the model analyses have sufficiently converged on a solution (e.g., based on a user defined convergence threshold) that is within a threshold value for the objective function (e.g., a threshold compliance or threshold stress). The threshold value may be defined by the designer. If the solution has not sufficiently converged, the master process 301 updates the design at step 320 and repeats the analysis and sensitivity analysis for a refined design.

If sufficient convergence is achieved, master process 301 outputs the design 350 and the optimization ends 380.

Typically, several practical measures are implemented for damage zone generation. For example, damage zones containing any point load are eliminated to preserve load conditions. If a damage zone increases the compliance by a significant margin compared to that of the undamaged structure at the start, the process may terminate. Such case can indicate that the structure's function depends on a narrow pathway that doesn't allow redundancy to be built. The margin threshold can be defined by the user (e.g., 10 times increase may be set).

For reducing computation cost, a threshold on the material volume inside a damage cube can be applied to reduce the total damage population. For example, a 10% threshold is used for the numerical examples discussed below.

For preserving load conditions one may freeze out a sufficiently large non-design domain around the loading points.

In general, implementations can accommodate any level of DS-A and DS-B damage population generation. However, for practical purposes, damage not exceeding Level 2 of DS-B can be used.

Parallel processing implementations, such as MPI, can utilize computing resources flexibly. When the number of computing nodes $N_C$ is smaller than $N_{MPI}$, several MPI processes are distributed onto each computing node. The operating system on each node manages multiple processes in the same manner as a computer handles multiple tasks. On a homogeneous HPC cluster one may choose $N_{MPI}$ as a multiple of $N_C$ for best computing resource utilization. Optimally, a sufficiently large HPC cluster with ($P_L$+1) computing nodes for shortest run time, as shown in FIG. 3, is used.

Figure 4A:
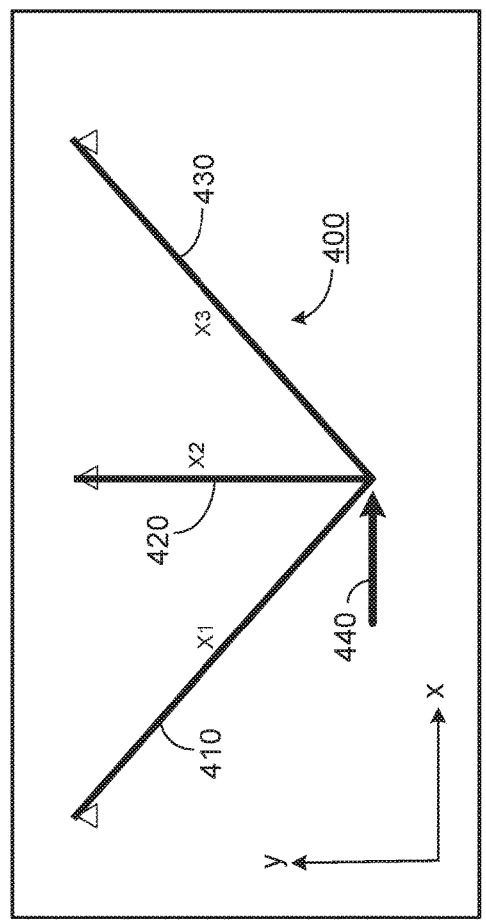
FIG. 4A shows a three bar truss.

Before turning to exemplary implementations, it is instructive to consider the concept of failsafe design using a simple three-bar truss 400, as shown in FIG. 4A. Truss 400 is formed from bars 410, 420, and 430, respectively. The X and Y dimensions of the truss is 100×50; the material properties are: E=2.1×10$^5$ and $\upsilon$=0.3; a horizontal load 440 of 1.0×10$^3$ is applied at the junction node of the three bars.

Design constraints for failsafe should primarily be stress and may include displacements. However for all examples in this application, a simplified optimization formulation—minimizing the compliance with a volume constraint—is used. This makes it relatively easy to study and compare results as this is the most used formulation for papers on topology optimization. It also allows one to study fundamental behaviors of a new type of problem on a well-behaved simple optimization problem. Compliance provides a clear global performance measure for comparison between various structural configurations involving failure scenarios. For the three-bar truss, minimizing compliance under a volume constraint is considered:

$$\text{Minimize } C(x)$$

$$\text{Subject to } V(x) - V^U \leq 0$$

$$x_i^L \leq x_i \leq x_i^U, \; i=1,2,3 \tag{5}$$

in which the upper bound of the volume constraint $V^U=1000$; the lower bounds of bar cross-sectional areas are set to zero, allowing truss members to vanish.

The optimization problem was solved using OptiStruct (Altair, Troy, Mich.). To obtain a fully converged solution, a very low convergence tolerance on the objective at 0.0001 was used and the run converged after 12 iterations. The optimal design, referred to as the Standard case, is given in Table 2. The middle bar 420 vanishes and the structure reduces to a two-bar truss. It is known that this design corresponds to the simplest case of the Michell cantilever truss.

Figure 4D:
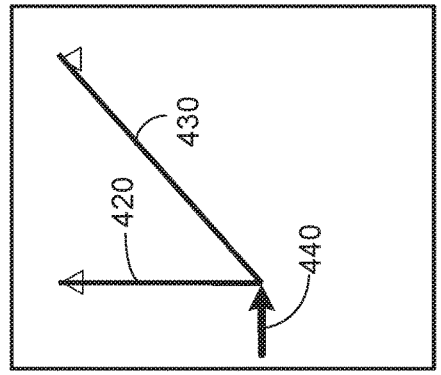
FIGS. 4B-D shows the three bar truss with different respective member failures.
Figure 4C:
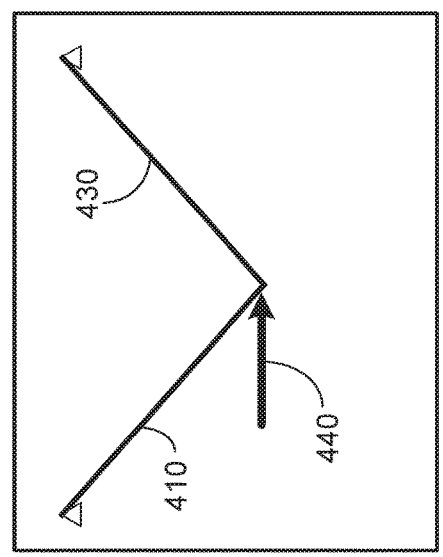
Figure 4B:
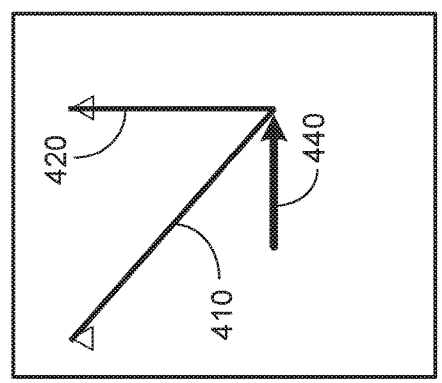

For a structure with predefined load carrying members, failsafe is defined as sustained structural integrity under the condition that an arbitrary structural member fails. For the given three-bar truss it means that the structure should survive under the three structural configurations shown in FIGS. 4B-4D, representing failure of the right bar 430, the middle bar 420, and the left bar 410, respectively. This design problem now involves three structural cases of distinct structural configurations under the same applied loads. This failsafe optimization problem with compliance as the performance measure can be formulated as follows:

Minimize $\text{Max}(C_j(x))$, $j=1,2,3$

Subject to $V(x)-V^U \leq 0$ $x_i^L \leq x_i \leq x_i^U$, $i=1,2,3$ which implies that optimization should target improving compliance of the worst failure cases. Note that Min(Max) compliance wouldn't be meaningful for different load cases since relative quantities of compliances do not have clear engineering implication. However, compliances under the same load conditions for different failure modes are meaningful engineering measures on how a failure impacts the total performance of the structure. For a structure under multiple load cases, one can regard the sum of compliances, termed total compliance, as the global performance measure of the structure. In other words, the compliance in Eq. 6 for each structural case involving one failed structural member becomes the total compliance under all load cases. OptiStruct was used to solve this multiple model optimization (MMO) problem. The same low convergence tolerance was used and the run converged in 21 iterations. The optimal design of the failsafe problem is included in Table 2, which also lists compliances for the three structural cases involving failures. Generally, compliance of a structure under a given load may be defined as the vector product of displacement and load $U^T P=U^T KU$, where P is the load vector, U is the displacement vector and K is the stiffness matrix. In the software implementation in OptiStruct used here, compliance is output as the total strain energy defined at $\frac{1}{2} U^T KU$.

Figure 4E:
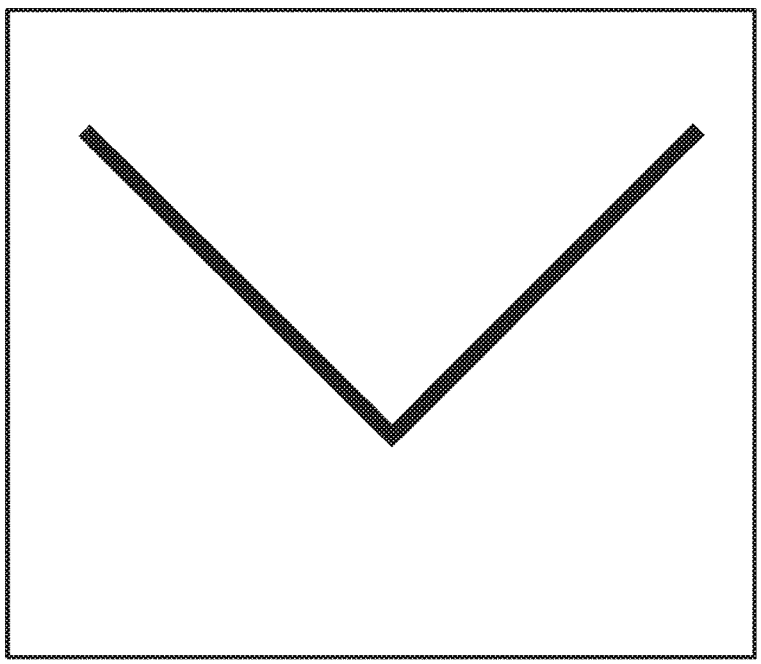
FIGS. 4E and 4F show optimal truss designs for the standard design (FIG. 4E) and failsafe design (FIG. 4F).
Figure 4F:
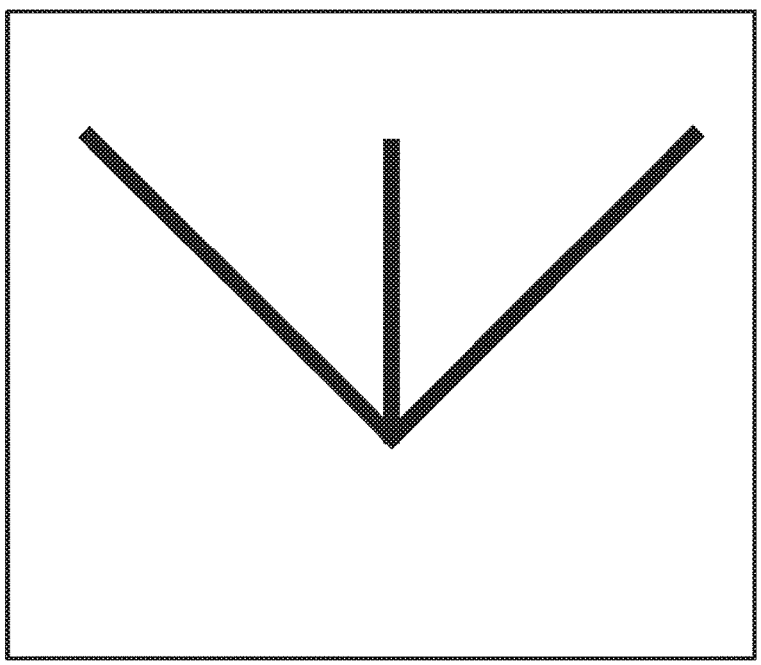

FIG. 4E illustrates the standard design and FIG. 4F illustrates the failsafe design. Obviously the structure needs redundant stable load transmission paths, hence all three bars are necessary for a failsafe design. The compliance of undamaged state is the same as that of the second failure case with vanishing middle bar. This can be understood as, given symmetry, there is no vertical displacement at the loading point, hence the vertical bar has zero strain under linear FEA assumption. The performance under the first and the third failure cases are significantly worse than the 45° two-bar configuration that corresponds to the optimal Michell truss. The optimization is driven by these two structural cases, which are referred to as the active structural cases for failsafe as they correspond to active constraints in the bound formulation for the Min(Max) problem.

TABLE 2

Conventional and failsafe designs of a three-bar truss

|  | x1 | x2 | x3 | Effective Volume | Compliance |
|---|---|---|---|---|---|
| Standard | 7.07 | 0.00 | 7.07 | 1000.00 | 23.80 |
| Failsafe | 5.22 | 5.22 | 5.22 | 1000.00 | 32.21 |
| Failure 1 | 0.00 | 5.22 | 5.22 | 630.60 | 87.00 |
| Failure 2 | 5.22 | 0.00 | 5.22 | 738.79 | 32.21 |
| Failure 3 | 5.22 | 5.22 | 0.00 | 630.60 | 87.00 |

EXAMPLES

Two 2D examples and one 3D example are discussed below to show the effect of failsafe on topology results. All examples use the same material properties: $E=2.1\times10^5$ and $\upsilon=0.3$. OptiStruct was used with default objective convergence tolerance at 0.005. For penalty value in Eq. 2 OptiStruct has a built-in gradual increase, with the default final penalty values at 3.0 for 2D and 4.0 for 3D structures. The minimum member size (minimum length scale) takes default value equal to three times the average mesh size.

Example 1: Rectangular Plate Under Shear Force

Figure 5A:
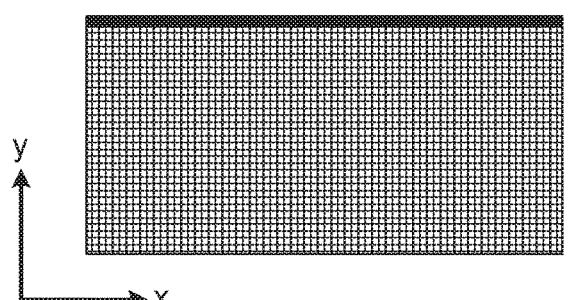
FIG. 5A shows a 2D structural continuum.

The failsafe scenario discussed in the three-bar truss example is reproduced using the damage model described above. The 2D domain has dimensions 100×50 with a thickness of 1.0, modeled with 200×100=20,000 quadratic elements. The load is the same as for the three-bar truss example: P=1000 is applied at the center of the bottom edge while the upper edge is fixed. The finite element model is shown in FIG. 5A, with dimension 50 in the y-direction and 100 in the x-direction. The same volume constraint of 1000 is used, which represents a 20% volume fraction of the design domain. A relatively large square damage size of 25×25 is considered.

Figure 5B:
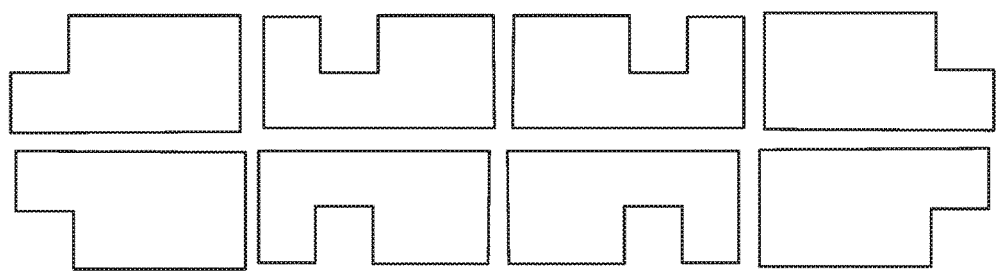
FIG. 5B shows the structural continuum of FIG. 5A with a square of damage at different locations in the continuum.
Figures 5C, 5D:
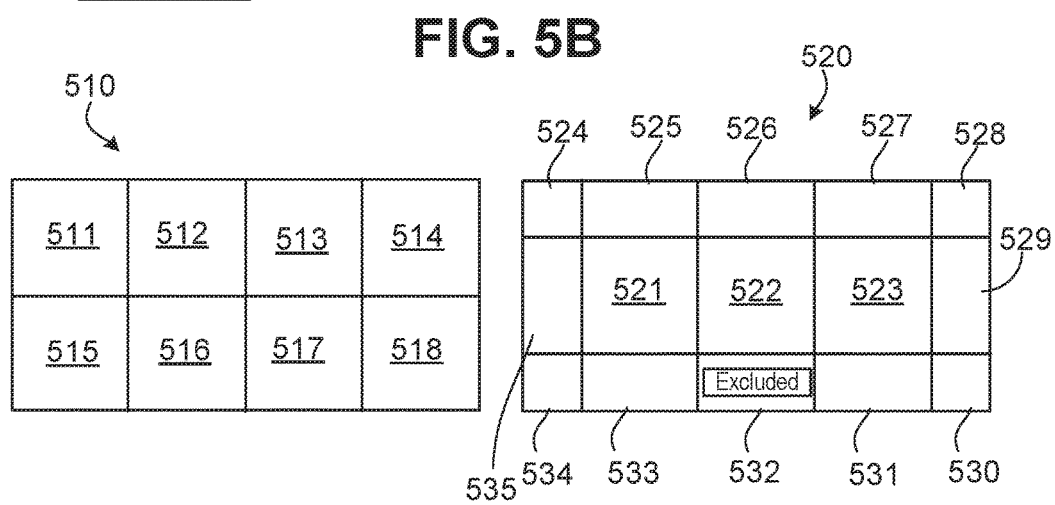
FIGS. 5C and 5D show the structural continuum of FIG. 5A with different damage arrangements for two different damage populations.

The models corresponding to damage population $PB_1$ are illustrated in FIG. 5B. For reference purpose damage populations $PB_1$ (510) and $PB_2$ (520) are shown in FIGS. 5C and 5D, respectively. For PB1 510, damage zones are labelled 511-518. For PB2, damage zones are labelled 521-535. Zone 532 of $PB_2$ was eliminated because it cut off the point load.

Referring to FIG. 6A, the optimum for this standard problem is a two-bar truss-like structure 610. The failsafe designs with $PB_1$ (620) and $PB_2$ (630) damage populations are shown in FIGS. 6B and 6C, respectively. The runs took 26, 39 and 39 iterations for the results FIGS. 6A-6C, respectively.

To provide a clear view on how the structure preserves certain level of structural integrity under each damage instance, models for damage population $PB_1$ are shown in FIGS. 7A-H with final failsafe topology result. The compliances of the standard and the failsafe design for $PB_1$ are listed in Table 3, including the compliances for all eight failure modes. In Table 4 the compliances for damage population $PB_2$ are listed, excluding smaller zones that were insignificant to the results. The compliance of the final standard design is 29.36, which is 23% above the compliance 23.80 of the two-bar truss discussed in section 2. This difference is due to several factors: (a) 1D vs. 2D modeling; (b) the penalty effect on the remaining semi-dense elements. It was found that the actual difference is about 18% due to factor (a) alone. In the comparisons, the results are accepted as they are obtained numerically with penalty effect included. The compliances, 42.14 and 41.48, for undamaged state under $PB_1$ and $PB_2$ are about 44% higher than the standard solution. At the final designs there are four active failure zones in the center (2, 3, 6, 7) for $PB_1$, with an additional zone (10) becoming active for $PB_2$.

One may question why the compliances of active zones are not exactly the same. This is expected: while the bound is the same for all active compliances within the problem formulated by convex approximation, the design variables are still changing slightly at the end, resulting in small differences after final analysis. From results in Table 3 and Table 4 it was noticed that a maximum compliance increase of about 120% compared to the undamaged state. This is less than the 170% increase observed for the three-bar truss design shown in Table 1. This indicates that the increased redundancy helped to improve risk mitigation.

TABLE 3

Compliances for optimal design under $PB_1$.

| Standard | Failsafe | Failure zones | | | |
|---|---|---|---|---|---|
| | $PB_1$ | 1 | 2 | 3 | 4 |
| 29.36 | 42.14 | 80.75 | 91.55 | 91.55 | 80.75 |
| | | 5 | 6 | 7 | 8 |
| | | 80.75 | 92.01 | 92.01 | 80.75 |

TABLE 4

Compliances for optimal design under $PB_2$.

| Standard | Failsafe | Failure zones | | | |
|---|---|---|---|---|---|
| | $PB_2$ | 1 | 2 | 3 | 4 |
| 29.36 | 41.48 | 82.23 | 92.22 | 92.22 | 82.23 |
| | | 5 | 6 | 7 | 8 |
| | | 82.52 | 93.17 | 93.17 | 82.52 |
| | | 9 | 10 | 11 | |
| | | 82.54 | 91.72 | 82.54 | |

Figure 8A:
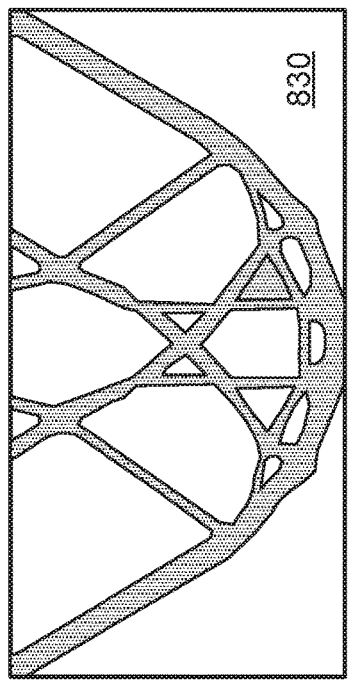
FIGS. 8A-8D show solutions for the two bar truss in the structural continuum of FIG. 5A also under shear force, but with damage populations shifted by ¼ the damage square edge length.
Figure 8C:
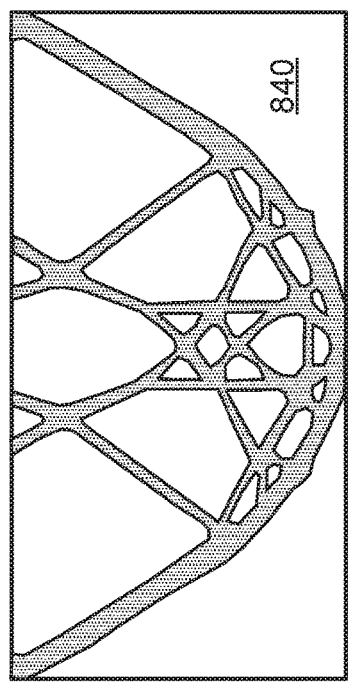
Figure 8B:
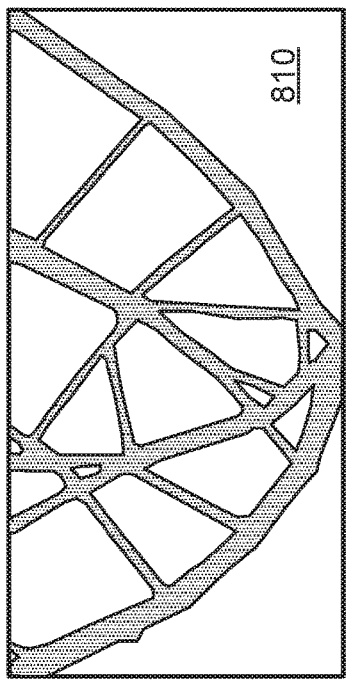
Figure 8D:
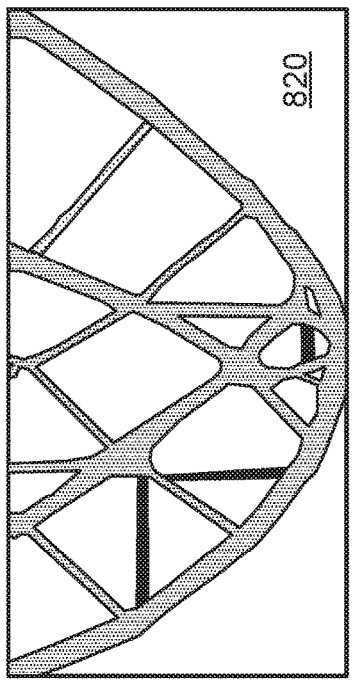

Referring to FIGS. 8A-8B, in order to study damage location dependency, the same example for $PB_1$ and $PB_2$ was run with locations shifted by ¼ of the square size in both X and Y directions. Design 810 resulted for $PB_1$ and design 820 resulted form $PB_2$. Asymmetry of the design is induced by asymmetric damage zone population. Referring to FIGS. 8C-8D, symmetry may also be enforced for topology optimization, resulting in designs 830 ($PB_1$) and 840 ($PB_2$). Globally the designs in FIGS. 8A-D and FIGS. 6A-6C share similar features in terms of load path redundancy. The iteration numbers and compliances of the four solutions are given in Table 5.

TABLE 5

Detailed results with shifted damage zone locations

| | Unrestricted | | Enforced symmetry | |
|---|---|---|---|---|
| | $PB_1$ | $PB_2$ | $PB_1$ | $PB_2$ |
| Iteration | 55 | 61 | 59 | 59 |
| Compliance | 43.59 | 43.47 | 43.6 | 44.78 |
| Max. Comp | 70.09 | 77.92 | 82.02 | 85.71 |

Example 2: Rectangular Plate Under Bending Force

The same design domain and FEA mesh from Example 1 was used, with the load P=1000 now applied at the center of the right edge while the left edge is fixed. The plate was optimized with 50% volume constraint. For failsafe design, a damage square size of 12.5×12.5 was used, and two runs with $PB_1$ and $PB_2$ were carried out. The damage population for $PB_1$ and for $PB_2$ added to $PB_1$ are shown in FIGS. 9A and 9B, respectively. The load was applied at location 901 and, for $PB_2$, the damage volume at this location was excluded from the calculation.

Final designs for standard (1010), failsafe $PB_1$ (1020) and $PB_2$ (1030) are shown in FIGS. 10A-10C, respectively. These results are obtained with 44, 49 and 49 iterations, and the corresponding compliances are 154.5, 195.1 and 195.3, respectively. For $PB_1$ result the maximum damaged compliance is 315.3, with the active damage zones shown in FIG. 9A, labelled A. For $PB_2$ result the maximum damaged compliance is 315.4, with active zones A shown in both damage layers in FIG. 9B. For this example, the results for base damage population $PB_1$ and increased population $PB_2$ turned out to be almost identical. Note that one should not assume that only the final active damage zones drove the design formation as some other zones could have been active during earlier iterations. Due to non-convexity induced by penalty formulation, results of topology optimization is inherently iteration history dependent.

The standard design would not survive the given damage size. As expected, the presence of damage population pushed the design towards redundant load paths. One can picture moving a laser cutter of the given damage size through the optimal failsafe design, and observe that the structure can sustain load carrying capacity with the laser pointed at any location except the loading point.

Example 3: 3D Control Arm

While the foregoing examples are 2D, 3D failsafe designs were also investigated. In particular, a 3D control arm that is available in an OptiStruct tutorial was investigated. The dimensions of the model were approximately 450×550×110, and the model contained 327,493 tetrahedron elements. Referring to FIG. 11A, the arm included two regions that were optimized, labeled 1101 and 1102. The arm also included five bearings 1110, 1120, 1130, 1140, and 1150, which were excluded from the optimization. A 30% volume fraction constraint was applied, as well as single draw direction constraint for casting manufacturing.

Figure 11B:
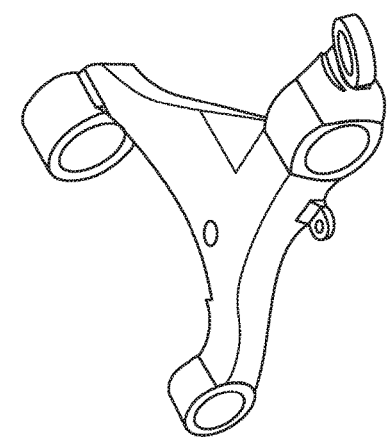
FIGS. 11A and 11B show a control arm under two different load cases.
Figure 11A:
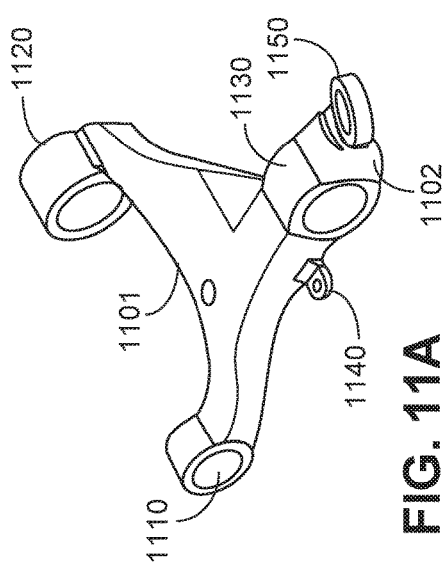

Two load cases were considered, shown in FIGS. 11A and 11B, respectively, representing different combinations of bending and torque. The total compliance of the two load cases was the response for the Min(Max) problem in Eq. 6.

Figure 12B:
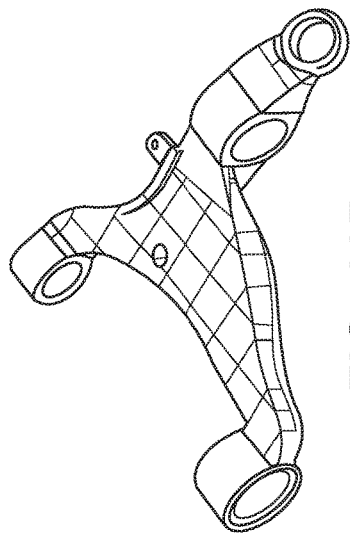
FIGS. 12A and 12B show two different damage populations for the control arm shown in FIGS. 11A and 11B.
Figure 12A:
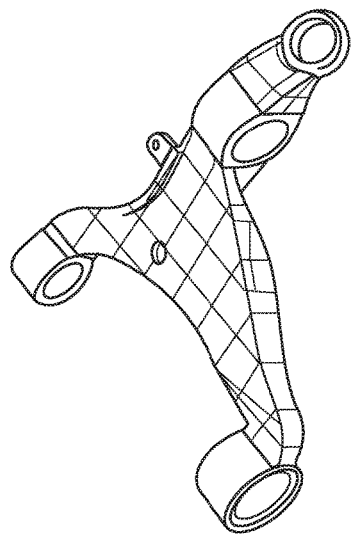

For the failsafe design, a damage cube size of 50×50×50 is imposed. Referring to FIGS. 12A and 12B, the base layer damage population $PB_1$ contained 45 cubes (FIG. 12A), and the enrichment layer for $PB_2$ added 28 more cubes (FIG. 12B).

Figure 13A:
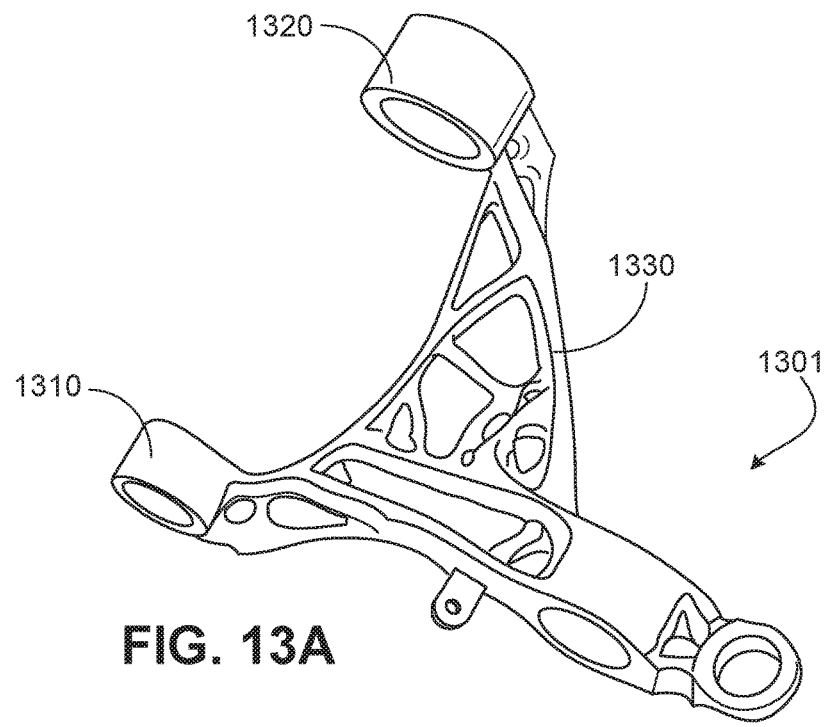
FIGS. 13A and 13B show the optimized design for the control arm for the Standard design (FIG. 13A) and failsafe (FIG. 13B).
Figure 13B:
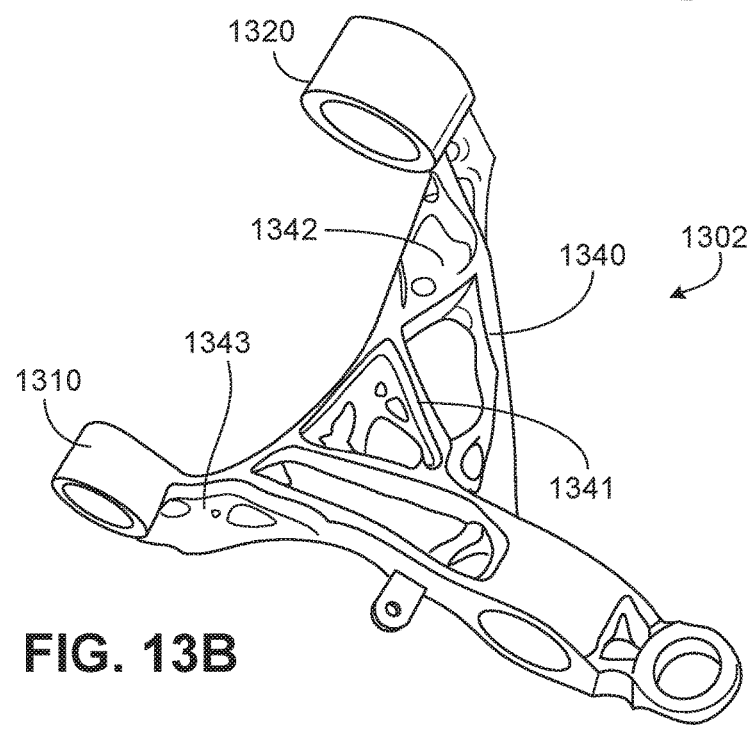

The optimal designs for standard (1301) and failsafe (1302) are shown in FIGS. 13A and 13B, respectively. The compliances of standard and failsafe designs are 162.3 and 193.7, and took 46 and 41 iterations, respectively. The maximum compliance of damaged structure is 756.8, corresponding to four active damage zones all close to the two vertical bearings 1310 and 1320 in FIG. 13A. The compliance loss is quite large at almost four times that of the undamaged state. This can be explained by comparing the structure of standard body 1330 with the failsafe body 1340. It is clear that all active failure zones close to bearings 1310 and 1320 will cause significant weakening of the already narrow pathways to the bearings. This clearly suggests to the designer that if failsafe of the structure is required additional bearings should help to widen the pathways for load transfer. Comparing FIGS. 13A and 13B, it is evidence that major failsafe features include an additional large rib 1341 in the middle of body 1340 and more redundancy 1342 and 1343 close to the two vertical bearings.

Additional Implementations

In general, the failsafe design techniques disclosed above can be used in a variety of design applications, such as in aircraft design, nuclear power plant design, and more generally in any engineering field where structural failure can result in catastrophic accident. Moreover, while the techniques are discussed with generic sphere and cube shaped damages, in general, damage can occur in different forms. For example, a ballistic impact could cause a penetration of a given shape and size.

The functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers (e.g., over a computer network, such as the internet). The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To send for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can send input to the computer. Other kinds of devices can be used to send for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Certain embodiments have been described. Other embodiments are in the following claims.

What is claimed is:

1. A computer-implemented method for designing a failsafe structure, the method comprising:
   defining a structural continuum in a computational environment, the structural continuum corresponding to a homogenous distribution of a solid material through a design volume;
   defining a damage volume in the structural continuum, the damage volume corresponding to a portion of the structural continuum devoid of the material at an arbitrary location within the design volume; and
   computationally optimizing a topology for a design of the failsafe structure subject to the damage volume and to one or more designated load cases,
   wherein the optimized topology for the design corresponds an inhomogeneous distribution of the solid material through the design volume such that the design volume is composed of portions of the solid material and voids, the solid material portions defining the failsafe structure which will continue to support all the designated load cases when the material is removed from a damage volume at any location in the design volume, and
   the computational optimization comprises performing a computational structural analysis on the structural continuum with a finite damage population, the finite damage population corresponding to locating the damage volume at a first series of different locations in the structural continuum, the damage volumes located at adjacent locations in the first series of different locations being non-overlapping damage volumes,
   wherein the computational optimization further comprises performing a computational structural analysis on the structural continuum for a second finite damage population, the second finite damage population corresponding to locating damage volumes at a second series of different locations, different from the first series, in the structural continuum.

2. The method of claim 1, wherein the computational structural analysis comprises analyzing a plurality of analysis models, each analysis model comprising the structural continuum with a corresponding instance of damage from the finite damage population.

3. The method of claim 2, wherein each analysis model is analyzed in parallel on a computer cluster.

4. The method of claim 1, wherein the finite damage population spans the structural continuum.

5. The method of claim 1, wherein, for the first series, damage volumes at adjacent locations contact at least one point in the structural continuum.

6. The method of claim 5, wherein, for the first series, there is no gap between damage volumes at the adjacent locations.

7. The method of claim 5, wherein, for the first series, there is no overlap between damage volumes at adjacent locations.

8. The method of claim 1, wherein the finite damage population excludes a damage volume from a location of a point load.

9. The method of claim 1, wherein, for each location in the first series, the damage volume has the same shape and dimensions.

10. The method of claim 1, wherein the second series has twice as many locations in each dimension as the first series.

11. The method of claim 1, wherein damage volumes of the second finite damage population overlap with damage volumes of the first damage population.

12. The method of claim 1, wherein the computational optimization comprises comparing a structural parameter of the structural continuum with the damage volume under the one or more designated load cases.

13. The method of claim 12, wherein the structural parameter of the structural continuum with the damage volume under the one or more designated load cases is compared to a structural parameter of an undamaged structural continuum under the one or more designated load cases.

14. The method of claim 12, wherein the structural parameter is a stress.

15. The method of claim 14, wherein the stress is below a threshold for the solid material for maintaining structural integrity of the structural continuum.

16. The method of claim 12, wherein the structural parameter is a compliance.

17. The method of claim 16, wherein the computational optimization comprises minimizing a largest compliance associated with each damage location of the finite damage population.

18. The method of claim 1, wherein the computational structural analysis is performed using a computational analysis method selected from the group consisting of finite element analysis (FEA), a boundary element method, and a meshless analysis method.

19. The method of claim 1, wherein a dimension of the damage volume is established based on design requirement for maximum damage size.

20. The method of claim 1, wherein the damage volume has a shape selected from the group consisting of spherical, cubic, rectangular, prismatic, cylindrical, and conic.

21. The method of claim 1, wherein the damage volume is contained within the structural continuum.

22. The method of claim 1, wherein the damage volume extends through the structural continuum.

23. The method of claim 1, wherein the failsafe structure comprises discrete structural members.

24. The method of claim 1, wherein a maximum member cross-sectional dimension is constrained to no more than half of the maximum damage dimension.

25. The method of claim 1, wherein the failsafe structure comprises structural members that are part of a monolithic component.

26. A system, comprising:
   a hardware processor and a memory storing instructions that when executed cause the hardware processor to:
   receive information defining:
      (i) a structural continuum in a computational environment, the structural continuum corresponding to a homogenous distribution of a solid material through a design volume; and
      (ii) a damage volume in the structural continuum, the damage volume corresponding to a portion of the structural continuum devoid of the material at an arbitrary location within the design volume; and
   optimize a topology for a design of a failsafe structure subject to the damage volume and to one or more designated load cases,
   wherein the optimized topology for the design corresponds an inhomogeneous distribution of the solid material through the design volume such that the design volume is composed of portions of the solid material and voids, the solid material portions defining the failsafe structure which will continue to support all the designated load cases when the material is removed from a damage volume at any location in the design volume, and
   the optimization comprises performing a computational structural analysis on the structural continuum with a finite damage population, the finite damage population corresponding to locating the damage volume at a series of different locations in the structural continuum, the damage volumes located at adjacent locations in the first series of different locations being non-overlapping damage volumes, and
   the computational optimization further comprises performing a computational structural analysis on the structural continuum for a second finite damage population, the second finite damage population corresponding to locating damage volumes at a second series of different locations, different from the first series, in the structural continuum.

27. A non-transitory computer readable medium storing a program causing a computer to execute a process for designing a failsafe structure, the process comprising:
   defining a structural continuum in a computational environment, the structural continuum corresponding to a homogenous distribution of a solid material through a design volume;
   defining a damage volume in the structural continuum, the damage volume corresponding to a portion of the structural continuum devoid of the material at an arbitrary location within the design volume; and
   computationally optimizing a topology for a design of the failsafe structure subject to the damage volume and to one or more designated load cases,
   wherein the optimized topology for the design corresponds an inhomogeneous distribution of the solid material through the design volume such that the design volume is composed of portions of the solid material and voids, the solid material portions defining the failsafe structure which will continue to support all the designated load cases when the material is removed from a damage volume at any location in the design volume, and
   the computational optimization comprises performing a computational structural analysis on the structural continuum with a finite damage population, the finite damage population corresponding to locating the damage volume at a series of different locations in the structural continuum, the damage volumes located at adjacent locations in the first series of different locations being non-overlapping damage volumes,
   wherein the computational optimization further comprises performing a computational structural analysis on the structural continuum for a second finite damage population, the second finite damage population corresponding to locating damage volumes at a second series of different locations, different from the first series, in the structural continuum.

28. A computer-implemented method for designing a failsafe structure, the method comprising:
   defining a structural continuum in a computational environment, the structural continuum corresponding to a homogenous distribution of a solid material through a design volume;
   defining a damage volume in the structural continuum, the damage volume corresponding to a portion of the structural continuum devoid of the material at an arbitrary location within the design volume; and
   computationally optimizing a topology for a design of the failsafe structure subject to the damage volume and to one or more designated load cases,
   wherein the optimized topology for the design corresponds an inhomogeneous distribution of the solid material through the design volume such that the design volume is composed of portions of the solid material and voids, the solid material portions defining the failsafe structure which will continue to support all the designated load cases when the material is removed from a damage volume at any location in the design volume, and the computational optimization comprises performing a computational structural analysis on the structural continuum with a finite damage population, the finite damage population corresponding to locating the damage volume at a first series of different locations in the structural continuum, the damage volumes located at adjacent locations in the first series of different locations being non-overlapping damage volumes, wherein the computational optimization comprises comparing a structural parameter of the structural continuum with the damage volume under the one or more designated load cases.

29. The method of claim 28, wherein the structural parameter of the structural continuum with the damage volume under the one or more designated load cases is compared to a structural parameter of an undamaged structural continuum under the one or more designated load cases.

30. The method of claim 28, wherein the structural parameter is a stress.

31. The method of claim 30, wherein the stress is below a threshold for the solid material for maintaining structural integrity of the structural continuum.

32. The method of claim 28, wherein the structural parameter is a compliance.

33. The method of claim 32, wherein the computational optimization comprises minimizing a largest compliance associated with each damage location of the finite damage population.

34. A system, comprising:
a hardware processor and a memory storing instructions that when executed cause the hardware processor to:
receive information defining:
(i) a structural continuum in a computational environment, the structural continuum corresponding to a homogenous distribution of a solid material through a design volume; and
(ii) a damage volume in the structural continuum, the damage volume corresponding to a portion of the structural continuum devoid of the material at an arbitrary location within the design volume; and
optimize a topology for a design of a failsafe structure subject to the damage volume and to one or more designated load cases,
wherein the optimized topology for the design corresponds an inhomogeneous distribution of the solid material through the design volume such that the design volume is composed of portions of the solid material and voids, the solid material portions defining the failsafe structure which will continue to support all the designated load cases when the material is removed from a damage volume at any location in the design volume, and the optimization comprises performing a computational structural analysis on the structural continuum with a finite damage population, the finite damage population corresponding to locating the damage volume at a series of different locations in the structural continuum, the damage volumes located at adjacent locations in the first series of different locations being non-overlapping damage volumes, and the computational optimization comprises comparing a structural parameter of the structural continuum with the damage volume under the one or more designated load cases.

35. A non-transitory computer readable medium storing a program causing a computer to execute a process for designing a failsafe structure, the process comprising:
defining a structural continuum in a computational environment, the structural continuum corresponding to a homogenous distribution of a solid material through a design volume;
defining a damage volume in the structural continuum, the damage volume corresponding to a portion of the structural continuum devoid of the material at an arbitrary location within the design volume; and
computationally optimizing a topology for a design of the failsafe structure subject to the damage volume and to one or more designated load cases,
wherein the optimized topology for the design corresponds an inhomogeneous distribution of the solid material through the design volume such that the design volume is composed of portions of the solid material and voids, the solid material portions defining the failsafe structure which will continue to support all the designated load cases when the material is removed from a damage volume at any location in the design volume, and the computational optimization comprises performing a computational structural analysis on the structural continuum with a finite damage population, the finite damage population corresponding to locating the damage volume at a series of different locations in the structural continuum, the damage volumes located at adjacent locations in the first series of different locations being non-overlapping damage volumes, wherein the computational optimization comprises comparing a structural parameter of the structural continuum with the damage volume under the one or more designated load cases.

* * * * *